United States Patent Office 2,876,316
Patented Mar. 3, 1959

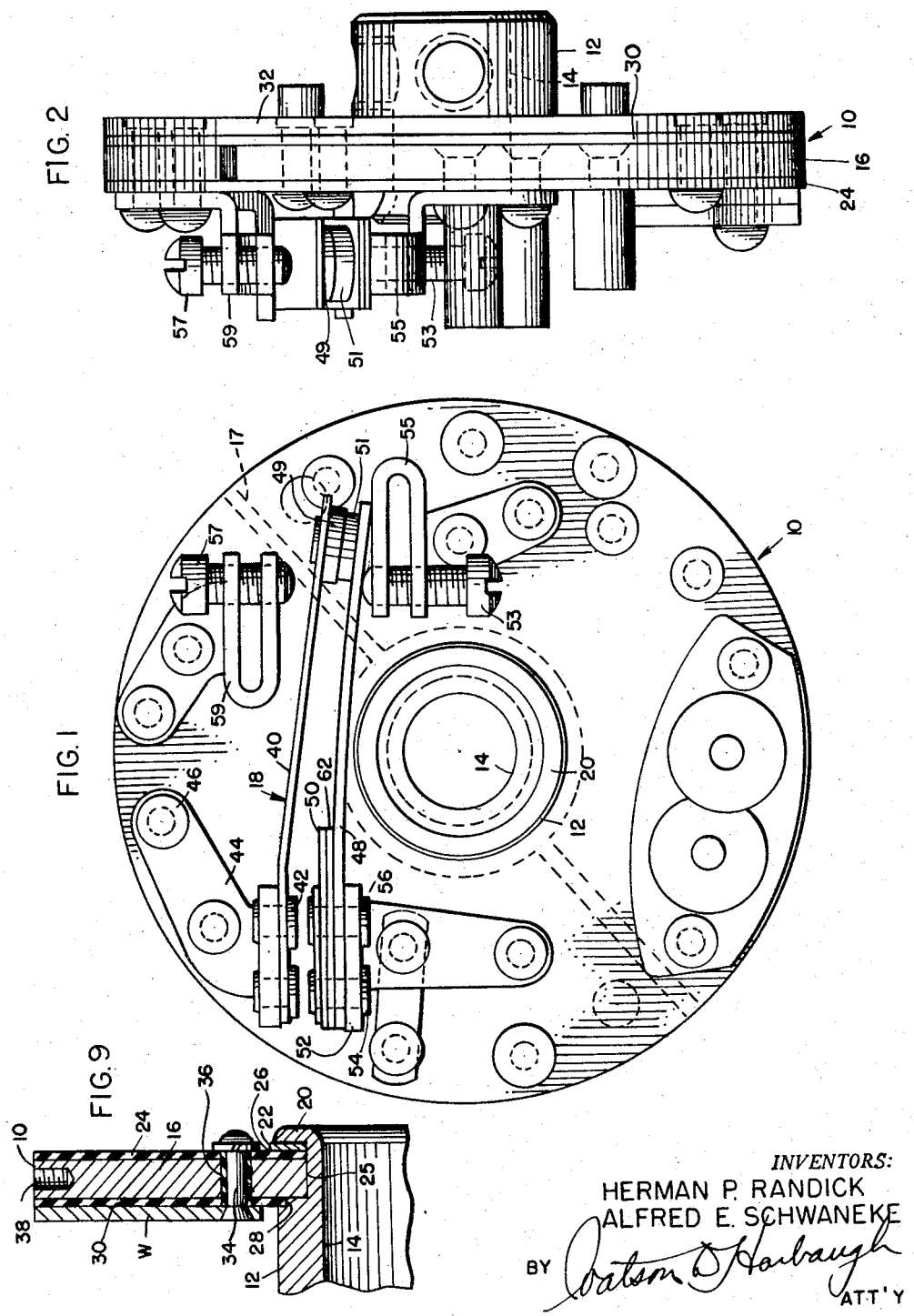

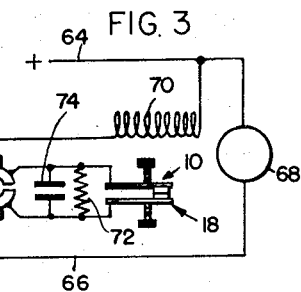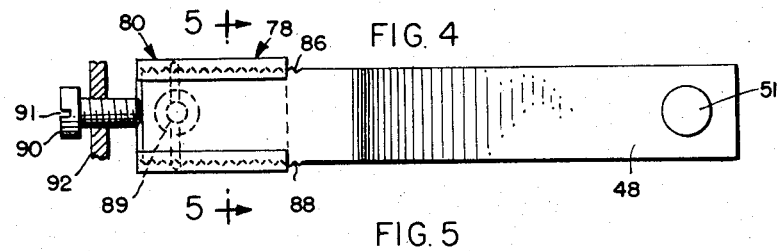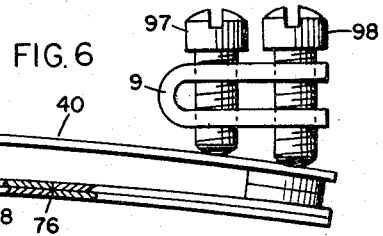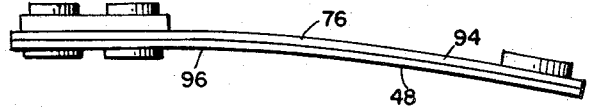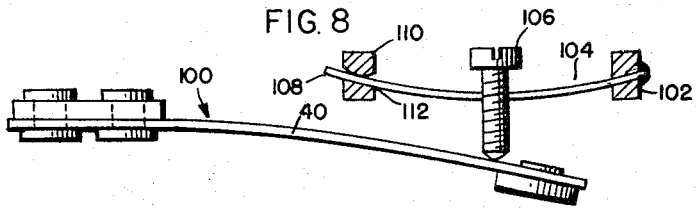

2,876,316

COMPENSATED SPEED GOVERNOR

Alfred E. Schwaneke, Northbrook, and Herman P. Randick, Chicago, Ill., assignors to A-M Company, Chicago, Ill., a partnership Application January 7, 1957, Serial No. 632,730

9 Claims. (Cl. 200—80)

This invention relates to compensated speed governors for prime movers in generator equipment, and more particularly to a compensated speed governor such as is described in our application filed concurrently herewith wherein means are provided for pre-setting a bi-metal control system calibrated to compensate automatically for the effect of temperature changes upon the drive unit and upon the work output of a driven unit.

Heretofore, it has been virtually impossible to accurately control an electric prime mover of the type described as temperature changes, particularly throughout a range of −65° F. to +165° F. because of composite variables occurring with temperature changes in both the drive and driven units and the different work requirements expected at different temperatures, a simple mechanical arrangement not being heretofore usable to control electrical output results.

Accordingly, it is an object of the present invention to provide a simple compensated speed governor compounded to have the requisite response and control characteristics to provide various speeds and work for all temperatures which may be encountered.

Another object of the invention is to provide a governor as described which may be tested and adjusted to achieve accurate calibration of a compensating means within given temperature ranges either for constant output or a changed output in accordance with a predetermined pattern either of speed or frequency output.

Another object of the invention is to provide an improved compensated speed governor wherein the increment of centrifugal force produced by speeds slightly in excess of the desired speed is effective to operate a bi-metal control element mounted eccentrically on the governor to produce slowing of the motor; conversely, a corresponding object is to provide a compounded bi-metal control as described which will also operate to maintain a constant speed when speed tends to fall below a predetermined level regardless of temperature changes, yet will provide a different speed at different temperatures if desired.

Another object of the invention is to provide a speed governor of the type indicated wherein the bi-metal control switch is responsive to changes in temperature in the motor and surrounding environment to compensate for or vary speed control effects otherwise produced thereby.

Another object of the invention is to provide an inductance for use within the circuit for the governor which is effective to permit speeding up of a shunt type D. C. motor to be controlled upon weakening of the field thereabout and correspondingly to afford slowing of the motor when the field is strengthened not only in connection with temperature changes of the motor, but also for temperature changes in a working unit driven by the motor.

Another object of the invention is to provide a resistance in the field circuit for the governor which is shorted to give the motor a high load starting characteristic until a predetermined speed of rotation is passed, whereupon shunting of the circuit through the said resistance is effected to give the motor an increasing speed characteristic, and thereafter the bi-metal contacts to produce slowing and increasing the motor operating speed characteristic by varying the field strength to maintain a predetermined speed.

Another object of the invention is to provide a bi-metallic control element which is longitudinally adjustable so as to vary the speed at which the motor is controlled with respect to temperature or work desired.

Another object is to provide a bi-metallic control element wherein the calibration is achieved in part by a pair of adjustment screws which may be disposed in accordance with a test procedure at a high and low temperature calibrated limit.

Another object of the invention is to provide a control means for the compensated speed governor as described wherein a set screw is adapted to position the blade of the member cooperating with the bi-metallic element, said set screw being mounted on a bracket having one end rigidly secured with respect to the disc of the governor and the other end slidably secured in a bracket element thereof whereby the element for contact with the bi-metallic element may be positioned selectively relative to the bi-metal.

Another object is to provide means for adjusting the position of a compound bi-metallic contact element as described which is effective to present a sharply defined base point for the said element to assure accurate response of the device.

Other objects and advantages of the invention will become apparent as the description proceeds.

Referring now to the drawings:

Fig. 1 is a plan view of a governor according to the invention carrying a bi-metallic control means therefor;

Fig. 2 is a side elevational view of the governor according to Fig. 1;

Fig. 3 is a diagrammatic view of a circuit for the governor;

Fig. 4 is an enlarged view of the bi-metallic element of the control means for the governor and bracket mounting elements therefor;

Fig. 5 is a detailed and large sectional view taken through the lines 5—5 of Fig. 4;

Fig. 6 is a fragmentary enlarged view of the bi-metallic control means and adjustment means therefor;

Fig. 7 is an enlarged fragmentary view of yet another means for controlling the operation of the bi-metallic member of the governor;

Fig. 8 is a disclosure of means for controlling the member operative with the bi-metallic member; and Fig. 9 is a fragmentary initial sectional view of the hub and plate joint for the governor.

Referring now to Figs. 1, 2, 4 and 5, the governor of the invention includes a wheel 10 comprising a hub portion 12 defining an axial bore 14 for mounting the governor upon a D. C. generator or motor or the like, and a wheel plate or circular disc 16 carrying a bi-metal control element 18. The disc 16, preferably of stainless steel or a similar material, is firmly secured upon the hub or sleeve 12, which is also preferably of stainless steel, by swaging the relatively thin upper end 20 of the sleeve outwardly to engage a metal washer 22 disposed in abutting relationship against a fibrous or insulating surface member 24; and the opposite face of the disc 16 is secured in position by a predetermined stepped configuration in the hub 12. This stepped configuration includes a deep recessed portion 25 dimensioned to engage the inner boundary of the disc snugly, a step 26 defined by the washer 22 and a shallow recessed shoulder portion 28 along one side of the deep recess 25 and adapted to receive an insulating layer 30 therein corresponding to the insulating layer 24 and providing therewith an electrical shield for the disc 16. These elements, as well as a split collector ring 32, are secured in position by a plurality of rivets such as the rivet 34, each of which is desirably surrounded by an insulating sleeve 36.

In order that the disc 16 may be properly balanced and adjusted, a plurality of radially disposed apertures 38 are defined peripherally thereof at predetermined spaced intervals. As seen in Fig. 1, the upper semi-circular portion of the disc 16 is relatively heavily weighted by the bi-metallic control 18; and therefore the recesses or apertures 38 are formed in this portion of the disc to compensate therefor.

The bi-metallic control 18 is disposed radially outwardly of the center of disc 16 a predetermined distance (i. e., eccentrically thereon) and comprises a relatively stiff stainless steel blade 40 mounted by rivets 42 upon a bracket 44 held by bolts or rivets 46 upon the disc 16, a stainless steel blade 48 and a bi-metal spacer bar 50 comprising one layer of metal having a relatively high coefficient of thermal expansion and another layer of metal having a relatively low coefficient of thermal expansion, the blade 48 and spacer 50 being mounted in a bracket 52 fixedly positioned on the disc 16. Each of the blades 40 and 48 is disposed substantially along a chord of the disc 16 and carries at its outer extremity a contact, designated by reference numerals 49 and 51, respectively. The blade 48 is normally disposed in contact and closed relationship to the blade 40 as determined by means of a threaded bolt 53 secured in a U-shaped bracket 55 secured to the disc 16. A corresponding adjustment bolt 57 mounted on a bracket 59 is disposed opposite the bolt 53 for limiting radial outward movement of blade 40 as hereinafter set forth.

In order to provide for adjustment of the effective moment arm of the blade 48, and thereby effectively calibrate the switch or control 18, variable axial positioning of the spacer bar 50 is afforded by means of a pair of bolts 54 and 56 received in a complementary pair of axially elongated apertures 58 and 60. Thus, the end 62 of the bar 50 acts as a fulcrum point about which the blade 48 deflects under the influence of centrifugal force acting thereon. The desired calibration may be determined by a number of runs, during which the bolts 54 and 56 may be set somewhat lightly, and upon obtaining the correct setting, these may be tightened very firmly to maintain the calibration.

The fulcrum point provided by the end 62 of the spacer bar is rectilinear and sharply defined, and so eliminates any variability in the action of the switch, such as would be produced by a rounded configuration therefor. This clean breaking action is therefore highly important to the effective operation of the governor.

It is also within the scope of the invention to utilize a pair of contact blades, one of which is a bi-metal element while forming the adjustable spacer bar of stainless steel or the like so as to provide compensation, either through a bi-metal spacer bar or bi-metal contact blade, for temperature changes.

Referring now to Fig. 3, a circuit is shown in diagrammatic form for the governor 10 of the invention and this circuit comprises a pair of positive and negative leads 64 and 66 having connected thereacross a generator motor 68. The governor 10 is adapted to be actuated by the motor by securing the hub 12 to a shaft thereof (not shown), and is in series with a field winding 70 thereof and in parallel with both a resistance 72 and a condenser 74.

When current is passed through the circuit, the blades 40 and 48 are in contact as stated, with the motor running at slow speed, with full power through the coil or inductance 70. Thereafter, at speeds which may be, for example, in the range of 5,000 to 8,000 R. P. M., centrifugal force causes blade 40 to break away and move up against bolt 57. Since the current is then shunted through the resistance 72, the amount of inductance effected by winding 70 is lowered to cause the speed to increase which may be, e. g., to an upper limit of 15,000 R. P. M. This moves the blade 48 into contact with blade 40, again to short resistance 72 so that the increased inductance reduces the speed.

When the governor 10 has been slowed sufficiently, for example, to a rate of 12,000 R. P. M., the bi-metallic element 48 falls back and remains in break position as a result of the lower centrifugal force until the shunt circuit through the resistance 72 once again creates a condition of slightly excessive speed, as described, with temperature changes being compensated for by blade 48, this controlling action taking place rapidly to accurately maintain the desired speed.

It is also within the scope of the invention to form blade 48 as a reverse welded bi-metal element whose calibration may be accomplished to some extent by changing the relative location of the welded juncture 76 (as seen in Figure 6) so that with temperature changes the centrifugal action on the said bi-metallic element is substantially as desired. Also, the bolt 53 is adjustable to set an initial speed for the governor while bolt 57 may determine the kickover point for the element 48.

In accordance with the present invention, other adjustable means are provided for compensating the natural tendency of the device to respond to an increase in temperature by a reduction in speed, and for other operational variations inherent therein. These means make it possible to calibrate the device any desired number of times without a change in the physical structure of the parts and in the contact blade 48, in particular.

Because the operation of the switch 18 is based on the centrifugal force derived from rotation of the governor 10 at a predetermined rate of angular rotation, a variation in the effective moment arm of the element 48 (or, in fact, of either of the blades 40 and 48 of the switch 18) will alter the response of the switch to make it close at either a higher or a lower rate for a given temperature.

Accordingly, the invention, in one embodiment thereof, provides for axial adjustment of a contact blade or blades disposed as described a predetermined distance radially from the center of the disc 16.

Referring then to Figs. 4 and 5, the means for effecting axial adjustment of the blade 48 are designated generally by reference numeral 78 and comprise a substantially U-shaped bracket 80 mounted on disc 16 by suitable means (not shown) and defining channel grooves 82 and 84 for receiving the blade 48, which is preferably serrated along the end portion of the longitudinal edges 86 and 88 thereof. The bracket 80 is preferably provided with clamping means such as the clamp 89 for drawing the edges of the bracket 80 into tight engagement with the serrated edges 86 and 88 of the contact blade 48. A set screw 90 is threadedly secured in an upstanding bracket 92 fixedly mounted on disc 16 in registration with the blade 48, and is preferably affixed to the blade for moving the blade in either direction axially. It is preferred that the blade be of the reverse bi-metal type (such as shown in Fig. 6), but in any event testing of the blade in various positions during several trial runs will serve to demonstrate the desired position of the blade for accurate operational control of a predetermined rotational velocity, and the bracket 80 can then be clamped hard to maintain the setting. Thus, rotation of the screw 90 in the appropriate direction by means of its kerf 91 will move the blade 48 outwardly of its mounting and increase the effective moment arm thereof so that the switch will be closed somewhat more readily and at a relatively lower speed of rotation. Such an adjustment would counteract the tendency indicated of the device to speed up in response to a lower temperature. And alternatively, adjustment of the blade toward the mounting would correct for a tendency of the device to slow down as temperature increased.

Referring now to Fig. 6, a third embodiment of the invention for adjustable calibration of the governor is shown, wherein the bi-metal blade 48 has set screw means provided for defining two limit positions for the flex operation of the blade 48, which has a compensation bi-metal portion 94 at its free end as defined by juncture point 76 and a welded bi-metal portion 96 at the fixed end thereof.

In order to calibrate the blade 48 for predetermined limiting conditions of operation, a pair of set screws 97 and 98 are threadedly received in a bracket such as the U-shaped bracket 99 which is mounted on the disc 16 by suitable support means (not shown). It is the purpose of one of the set screws, i. e., the set screw 97, to provide a limit position for the blade 40 (and consequently, the blade 48) at low speed and relatively cold temperatures, and in a preferred setting the blade 40 will contact the screw 97 at room temperature or lower to define a speed setting for the governor at a speed such as, for example, 385 cycles per second. Correspondingly, the set screw 98 provides a limiting setting for relatively high speeds such as, for example, 410 cycles per second and relatively warm temperatures, at which point contact is made between the set screw 98 and the blade 40 which is then deflecting about the point of contact of the screw 97 therewith. Therefore, this set screw can be appropriately used for different settings above those of set screw 97. The compensated control thus achieved is effective to within one cycle, plus or minus, in the range indicated.

Referring now to Fig. 8, yet a fourth form of the invention is disclosed wherein adjustment means for calibrating the action of a heat-responsive compensating means is designated by reference numeral 100 and comprises a bracket 102 secured to the disc 16 and fixedly engaging a bi-metallic blade 104 of flexible characteristic having threadedly received therein a set screw 106. The free end 108 of the bi-metal element 104 is slidably received in a second bracket 110 also secured to the disc 16 and defining a slot 112.

The action of the bi-metal element 104 is transmitted to the contact blade 40 by means of the set screw 106, as shown, and upon heating of the element 104, the said element will warp to vary the vertical position of the set screw and the blade 40, as well as affording adjustment of the position of the screw relative to blade 40 laterally. The calibration of the compensating action upon the pair of steel contact blades preferably used in this form of the invention is again determined by operation of the governor, and is achieved by means of rotating the set screw to vary its position vertically relative to the bi-metal element 104.

The calibration by the means of the invention may therefore be accomplished without the need for complex mechanism or special skills, and may be accomplished as often as desired to meet the effects of use or varying conditions of operation. The device is simple in structure and operation, so as to minimize the likelihood of mechanical breakdown, and the secure manner in which the desired calibration is maintained assures continuous satisfactory operation and accurate control over a wide range of temperatures.

Although we have herein set forth and described our invention with respect to specific principles and details thereof, it will be obvious to those skilled in the art that these may be modified within the spirit and scope of the invention as defined in the hereunto appended claims.

We claim:

1. A compensated speed governor for a generator motor or the like comprising a rotatable disc, a switch mounted radially outwardly of the center of said disc and substantially along a chord thereof including a pair of centrifugally deflectable contact blades disposed in substantially parallel spaced relation for closing the switch at a predetermined rate of angular rotation of said disc and in response to a predetermined rate of angular rotation thereof, one of said contact blades being a bi-metal element, and means for adjusting the free axial length of said bi-metal element to vary the effective moment arm thereof and consequently the response thereof to a centrifugal force of predetermined magnitude.

2. A compensated speed governor for a generator motor or the like comprising a rotatable disc, a switch mounted radially outwardly of the center of said disc and substantially along a chord thereof including a pair of centrifugally deflectable contact blades disposed in substantially parallel spaced relation for closing the switch at a predetermined rate of angular rotation of said disc and in response to a predetermined rate of angular rotation thereof, one of said contact blades being a bi-metal element, and means for adjusting the free axial length of said bi-metal element to vary the effective moment arm thereof for accurate calibration of its control response, said means including a bracket for slidably receiving said bi-metal element and set screw means for effecting sensitive axial positioning of said element in said bracket.

3. A compensated speed governor for a generator motor or the like comprising a rotatable disc, a switch mounted radially outwardly of the center of said disc and substantially along a chord thereof including a pair of centrifugally deflectable contact blades disposed in substantially parallel spaced relation for closing the switch at a predetermined rate of angular rotation of said disc and in response to a predetermined rate of angular rotation thereof, one of said contact blades being a bi-metal element, and means for adjusting the free axial length of said bi-metal element to vary the effective moment arm thereof for accurate calibration of its control response, said means including a substantially U-shaped bracket defining grooves adapted to snugly engage the sides of said element but permitting longitudinal movement of said bi-metal element and set screw means for effecting sensitive longitudinal positioning of said element in said bracket, said sides of said element contiguous with said bracket being serrated and said bracket having clamp means associated therewith for tight clamping engagement between said bracket and said bi-metal element.

4. A compensated speed governor for a generator motor or the like comprising a rotatable disc, a switch mounted radially outwardly of the center of said disc and substantially along a chord thereof including a pair of contact blades disposed in substantially parallel spaced relation for centrifugal deflection at a predetermined rate of angular rotation of said disc and in response to a predetermined rate of angular rotation thereof, one of said contact blades being a bi-metal element, and plural set screw means spaced apart longitudinally along said blades for defining respectively a first limit position for said bi-metal element corresponding to a lower temperature and speed phase for said governor and a second limit position for a higher temperature and speed phase.

5. A compensated speed governor for a generator motor or the like comprising a rotatable disc, a switch mounted radially outwardly of the center of said disc and substantially along a chord thereof including a pair of contact blades disposed in substantially parallel spaced relation for centrifugal deflection at a predetermined rate of angular rotation of said disc and in response to a predetermined rate of angular rotation thereof, one of said contact blades being a bi-metal element, and plural means for defining respectively a first limit position for said bi-metal element corresponding to a lower temperature and speed phase for said governor and a second limit position for a higher temperature and speed phase, said means including a pair of set screws spaced apart longitudinally along said blades and bracket means threadedly receiving said set screws and being secured to said disc, said set screws being incrementally positional for selective adjustment of said limit position.

6. A compensated speed governor for a generator motor or the like comprising a rotatable disc, a switch mounted radially outwardly of the center of said disc and substantially along a chord thereof including a pair of centrifugally deflectable contact blades disposed in substantially parallel spaced relation for closing the switch at a predetermined rate of angular rotation of said disc and in response to a predetermined rate of angular rotation thereof, and means for varying the effective moment arm of one of said blades for accurate calibration of the control response thereof, said means for adjustment of the effective moment arm of said one blade including a support means for said one blade, a bi-metal bar slidably mounted on said support means in contiguous parallel relation with said one blade and means for securing said bar in predetermined axial positions along said one blade.

7. A compensated speed governor for a generator motor or the like comprising a rotatable disc, a switch mounted radially outwardly of the center of said disc and substantially along a chord thereof, including a pair of centrifugally deflectable contact blades disposed in substantially parallel proximately spaced relation for closing the switch at a predetermined rate of angular rotation of said disc and in response to predetermined centrifugal force resulting therefrom, thermostatic control means associated with at least one said contact blade for compensating for temperature changes acting on said governor and adjustable means for calibrating said thermostatic control means, said thermostatic means comprising a relatively flexible bi-metal element and bracket means fixedly secured to said element at one end thereof and slidably receiving the other end of said element, and means carried by said bi-metal element for transmitting compensating action from said bi-metal element to one of said contact blades.

8. A compensated speed governor for a generator motor or the like comprising a rotatable disc, a switch mounted radially outwardly of the center of said disc and substantially along a chord thereof, including a pair of centrifugally deflectable contact blades disposed in substantially parallel proximately spaced relation for closing the switch at a predetermined rate of angular rotation of said disc and in response to predetermined centrifugal force resulting therefrom, thermostatic control means associated with at least one said contact blade for compensating for temperature changes acting on said governor and adjustable means for calibrating said thermostatic control means, said thermostatic means comprising a relatively flexible bi-metal element and bracket means fixedly secured to said element at one end thereof and slidably receiving the other end of said element, and means carried by said bi-metal element for transmitting compensating action from said bi-metal element to one of said contact blades, said adjustable means comprising a set screw threadedly received in said bi-metal element intermediate the ends thereof and adapted to contact said one of said blades adjacent a free end thereof whereby to afford accurate calibration of said bi-metal element.

9. A compensated speed governor for a generator motor or the like comprising a rotatable disc, a switch mounted radially outwardly of the center of said disc and substantially along a chord thereof including a pair of centrifugally deflectable contact blades disposed in substantially parallel spaced relation for closing the switch at a predetermined rate of angular rotation of said disc and in response to a predetermined rate of angular rotation thereof and means for adjustment of one of said blades to vary the effective moment arm thereof for accurate calibration of the control response thereof, said means for adjustment of the effective moment arm of said one blade including a support means for said one blade, a bi-metallic bar slidably mounted on said support means in contiguous facing relation with said one blade and means for securing said bar in predetermined position axially of said one blade, said bar defining a rectilinear fulcrum edge at its outer end with respect to said support means and said one blade being adapted to deflect about said edge in effecting said compensating action to afford a positive, sharply defined make-and-break action for said switch.

References Cited in the file of this patent

UNITED STATES PATENTS

| | | |
|---|---|---|
| 2,101,447 | Oldham | Dec. 7, 1937 |
| 2,103,589 | Lee et al. | Dec. 28, 1937 |
| 2,588,301 | Snyder | Mar. 4, 1952 |